Figure 1:
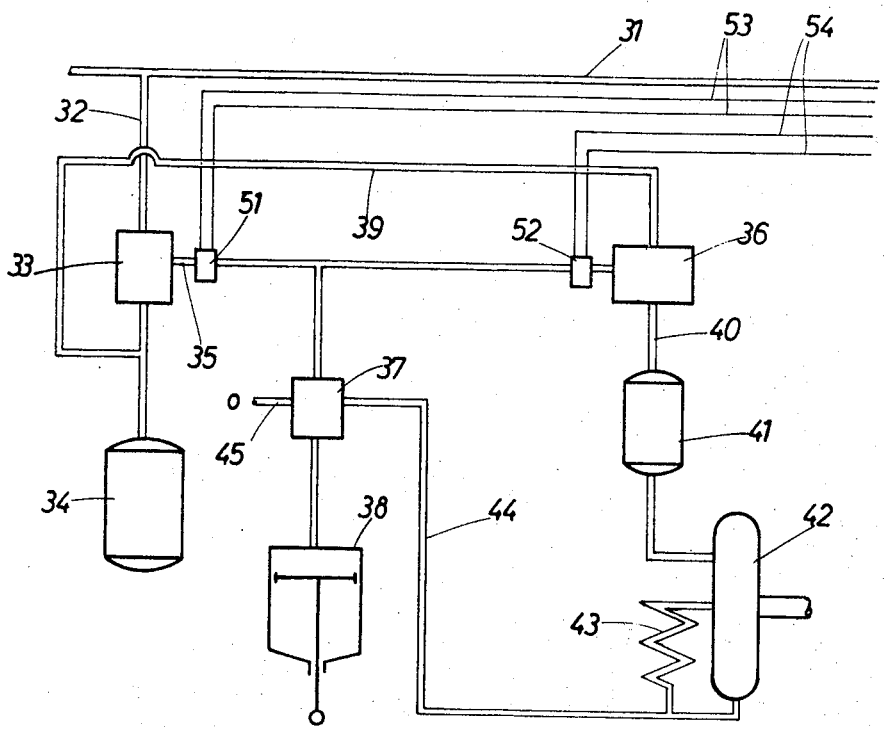

United States Patent [19]
Pollinger et al.

[11] 3,823,986
[45] July 16, 1974

[54] BRAKING DEVICE FOR RAILROAD VEHICLES

[75] Inventors: Hans Pollinger; Erich Falke, both of Munich, Germany

[73] Assignee: Knorr-Bremse GmbH, Munich, Germany

[22] Filed: Oct. 18, 1971

[21] Appl. No.: 190,202

Related U.S. Application Data

[63] Continuation-in-part of Ser. No. 882,847, Dec. 8, 1969, abandoned.

[30] Foreign Application Priority Data
Dec. 9, 1968 Germany............................ 1813469

[52] U.S. Cl.................................. 303/21 F, 188/33
[51] Int. Cl.............................................. B60e 8/06
[58] Field of Search......... 188/271, 296, 33, 181 A; 303/21 F, 21 CH, 21 CG; 295/36 R

[56] References Cited
UNITED STATES PATENTS
2,434,701  1/1948  Kemler........................ 188/271 X
2,517,531  8/1950  Anderson...................... 188/271

3,131,976  5/1964  Miller.......................... 303/21 F X
3,460,486  8/1969  Bodine........................ 295/36 X
3,467,444  9/1969  Leiber............................. 303/68

FOREIGN PATENTS OR APPLICATIONS
466,436  5/1937  Great Britain..................... 188/296

Primary Examiner—Duane A. Reger
Assistant Examiner—D. C. Butler
Attorney, Agent, or Firm—Edmond M. Jaskiewicz

[57] ABSTRACT

A railway vehicle having a friction braking system has a hydrodynamic braking unit enclosed in a housing mounted in the vicinity of a wheel and axle supporting the vehicle. The rotor of the braking unit is drivingly connected to the axle and a control system introduces fluid into the braking unit to achieve a braking effect. A common control device is employed for actuating the friction braking means and the hydrodynamic braking unit. The control device includes an anti-skid device and also operates to render the hydrodynamic braking unit inoperative when the vehicle is traveling at a sufficiently low speed or when the friction braking means exerts only a light braking action.

1 Claim, 2 Drawing Figures

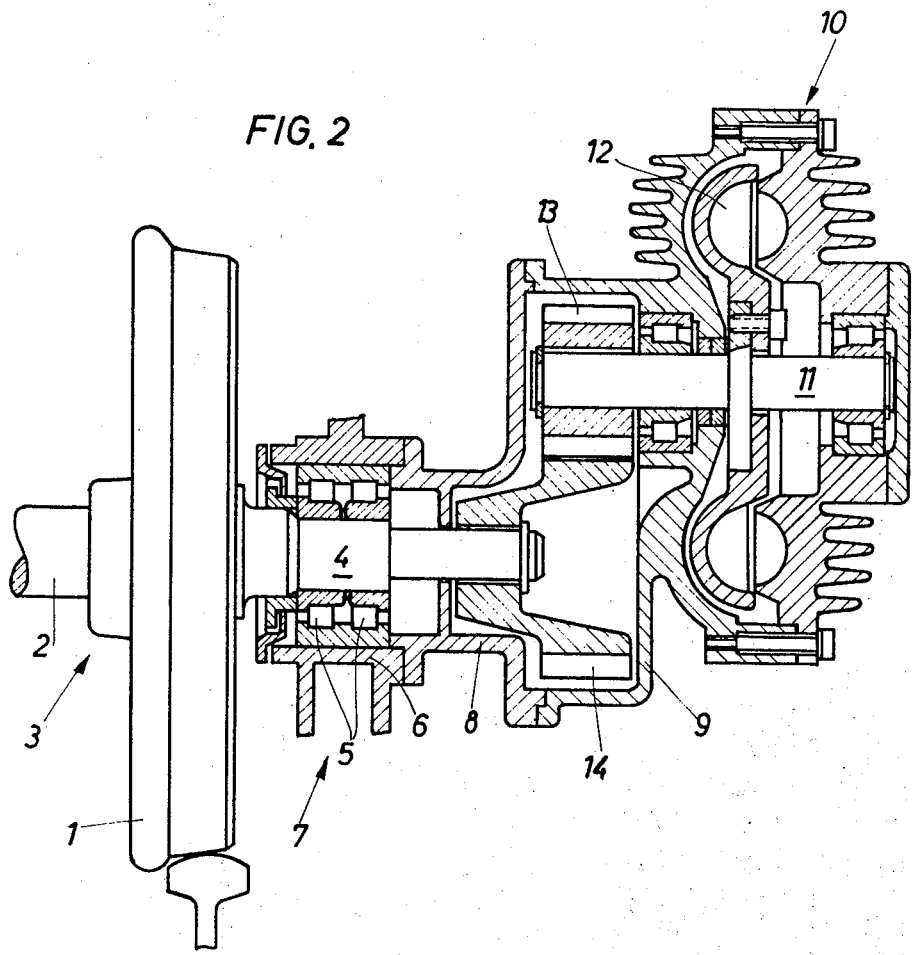

3,823,986

BRAKING DEVICE FOR RAILROAD VEHICLES

RELATED APPLICATION

The present application is a continuation-in-part application of the copending application Ser. No. 882,847 filed on Dec. 8, 1969 by the same named inventors now abandoned.

The present invention relates to a braking system for railroad vehicles equipped with both a friction brake and a hydrodynamic braking unit driven by the wheels of the vehicle, more particularly, to such a braking device having an anti-skid device.

Railway vehicles which are generally equipped with a friction brake usually in the form of a compressed air braking system have also been provided with a second brake operable independently of the friction brake. This second brake has been of the type generally known as a generator brake or eddy current brake. The two brakes are actuated from a common control device which may further be provided with a switching arrangement which maintains the friction brake in its released position while the second brake is providing braking action. However, the use of such a second brake has not been satisfactory in view of the high expense for constructing electric generator brakes and eddy current brakes which would produce a sufficient braking effect. Further, a source of electrical energy must be provided to operate these brakes but all railway vehicles particularly non-propelled railway vehicles are not necessarily provided with sources of electrical energy.

It has also been proposed to provide a hydrodynamic braking unit as the second brake. Such a unit is constructed as an independent structural unit which is directly driven through gearing or other power transmission means by a wheel and axle assembly of the vehicle. A common control device for both brake devices has also been provided which has included a control switch which maintains the friction brake in the release position while the second brake device is operative. However, such known braking systems have the disadvantage that only the compressed air brake was equipped with an anti-skid device while the second or hydrodynamic braking unit was not provided with such a device. In the case of extremely high braking action by the hydrodynamic braking unit the wheel assemblies of the vehicle can be slowed to a number of revolutions which is much too low with respect to the speed of travel of the vehicle. As a result, the railroad vehicle wheels may slide over the rails at a high sliding velocity. No flat spots on the wheels are generally caused by such a sliding phenomenon but this sliding or skidding does reduce the braking force acting on the railroad vehicle because of the reduction of friction between the rail and wheel during skidding. This considerably increases the distance required to brake the vehicle. In addition, the above mentioned sliding phenomenon cause a high degree of wear both on the wheels and on the rails.

It is therefore the principal object of the present invention to provide a braking system for a railroad vehicle having both a friction brake and a hydrodynamic braking unit wherein the application of the braking force applied by the hydrodynamic braking unit is controlled to avoid skidding of the vehicle.

It is another object of the present invention to provide a railroad vehicle braking device having an anti-skid device which is effective upon both the friction brakes and hydrodynamic braking units mounted on the vehicle.

It is a further object of the present invention to provide such a braking device for railroad vehicles which is simple and inexpensive in construction and reliable and effective in operation.

According to one aspect of the present invention there is essentially provided a braking system which includes an anti-skid device which releases both the friction brake and the hydrodynamic braking units upon being actuated during a braking operation. A non-driving railroad vehicle is provided with wheel and axle means supporting the vehicle which is equipped with friction braking means. A structurally independent hydrodynamic braking unit is drivingly connected to the wheel and axle means. Also provided is control means for selectively switching the braking unit and the friction braking means between braking and non-braking operations. Also included are means responsive to the skidding of the wheels upon a surface for releasing both the friction braking means and hydrodynamic braking unit when skidding occurs.

The braking device may also comprise means responsive to either the vehicle speed decreasing below a predetermined value or the friction braking means being lightly engaged for disconnecting the hydrodynamic braking unit so as to avoid any additional braking action which may cause skidding of the wheels on the rails.

Other objects and advantages of the present invention will be apparent upon reference to the accompanying description when taken in conjunction with the following drawings, which are exemplary, wherein;

FIG. 1 is a schematic representation of a common control system for a compressed air brake and a hydrodynamic braking unit including an anti-skid device; and FIG. 2 is a vertical sectional view of a hydrodynamic braking unit mounted on the axle bearing housing of a wheel and axle assembly of a railroad vehicle.

Proceeding next to the drawings wherein like reference symbols indicate the same parts throughout the various views a specific embodiment and modifications will be described in detail.

As may be seen in FIG. 1, there is provided an anti-skid device that acts both on the friction brake operated by compressed air and also on the hydrodynamic braking unit and controls the hydrodynamic braking unit which is illustrated in FIG. 2 and will be subsequently described in greater detail. The main air supply line 31 is connected through conduit 32 to a brake control valve 33. The brake control valve 33 is connected to an auxiliary air reservoir 34 and to a brake cylinder line 35. The line 35 is provided with an anti-skid valve 51 and leads to an operating valve 36 and through a switching device 37 to a brake cylinder 38 in parallel with valve 36. A valve such as disclosed in FIG. 1 of the U.S. Pat. No. 3,467,444 issued on Sept. 16, 1969 may be used as the anti-skid valve 51. A control valve 52 is connected in line 35 before the operating valve 36. The operating valve 36 is supplied with compressed air through conduit 39 from the auxiliary reservoir 34 and is connected by a control line 40 to an actuating cylinder 41 for a hydrodynamic braking unit 42. When air pressure is applied through conduit 35 to the operating valve 36, this valve initiates introducing a hydraulic fluid into the hydrodynamic braking unit 42 from the actuating cylinder 41. A cooling unit 43 is connected in a known manner to the hydrodynamic braking unit 42. A control line 44 leads from the pressure side of cooler 43 to the control input of switching device 37. When there is no pressure in control line 44 the switching device 37 will connect the brake cylinder conduit 35 with brake cylinder 38. As soon as the pressure appears in control line 44 the switching device will be actuated to shut off the connection between braking cylinder 38 and conduit 35 and connects brake cylinder 38 to the atmosphere through a vent 45.

The anti-skid valve 51 is actuated by a known anti-skid regulator, not shown in the drawings, through electric leads 53. When there is no current in the leads 53 the valve 51 opens the passage through the brake cylinder conduit 35. Upon energization of valve 51 this passage is blocked and that section of the conduit 35 leading to the operating valve 36 and switching device 37 is opened to the atmosphere.

The control valve 52 can be actuated through leads 54 by a switch responsive to the speed of the vehicle and by a device for adjusting the traction desired to be exerted by the braking system whereby the brake control valve 33 can be set to a high or low braking effect. When valve 52 is in a position corresponding to high vehicle speed and to a high braking effect, conduit 35 will be opened to the operating valve 36. However, when the valve 52 is in a position corresponding to a low vehicle speed and/or a low braking effect, the conduit 35 will be blocked and that portion of the conduit 35 leading to the operating valve 36 will be opened to the atmosphere.

When the brakes are released the brake control valve 33 which is controlled by the pressure in the main air supply line 31 and in branch conduit 32 maintains the connection of brake cylinder conduit 35 to the atmosphere. When the brakes are in operating condition and are ready for application the auxiliary reservoir 34 is charged with compressed air. Independently of the position of control valve 52, the operating valve 36 will maintain the hydrodynamic braking unit 42 unfilled so that no braking effect will be exerted by the unit 42. The control line 44 thus does not have any pressure and the brake cylinder 38 will be connected to the atmosphere by means of the switching device 37, the non-energized anti-skid valve 51 and brake cylinder conduit 35.

When the pressure in the main air supply line 31 and branch line 32 is properly varied to initiate the braking action, the control valve 33 will divert compressed air from the auxiliary reservoir 34 into brake cylinder conduit 35. When the vehicle is traveling at a high speed and a high braking effect is desired the compressed air will flow through anti-skid valve 51 and control valve 52 to the operating valve 36 which will actuate the cylinder 41 over the control line 40 to introduce hydraulic fluid into the hydrodynamic braking unit 42. The introduction of the hydraulic fluid into the braking unit 42 together with the rotation of the rotor will produce a pressure at the pressure connection of cooler 43 and also in control line 44. The line 44 will thus actuate the switching device 37 to block brake cylinder 38 from conduit 35 and vent the brake cylinder to the atmosphere. As a result, only the hydrodynamic braking unit 42 exerts a braking action while the friction brake which is operated by the brake cylinder 38 remains released.

In the event the hydrodynamic braking unit 42 loses its braking effect for any reason or becomes incapable of operation the pressure in control line 44 will drop. This pressure drop will actuate switching device 37 to connect the brake cylinder 38 to brake conduit 35. The brake cylinder 38 will then be filled with compressed air from conduit 35 and will operate the friction brake. The friction brake thus exerts a braking action while the hydrodynamic braking unit 42 is ineffective.

Should the speed of the vehicle decrease below a certain level when the hydrodynamic braking unit is in operation, the control valve 52 will be actuated and will empty to the atmosphere that portion of brake conduit 35 leading to operating valve 36. Subsequently, operating valve 36 will act to release the hydrodynamic braking unit 42. The withdrawal of fluid from braking unit 42 will cause a loss in pressure in control line 44 and switching device 37 will be actuated to supply compressed air to brake cylinder 38. As a result, hydrodynamic braking unit 42 will become ineffective and the friction brake connected to exert braking action.

When the brakes are released, all components will return to the starting position. Brake control valve 33 will empty brake conduit 35 and brake cylinder 38 to the atmosphere. This will release both the hydrodynamic braking unit 42 and the friction brake.

Should the anti-skid regulator be actuated during a braking operation to energize anti-skid valve 51, both the hydrodynamic braking unit 42 and the friction brake will be released as long as valve 51 is energized and will empty to the atmosphere that portion of brake conduit 35 leading to operating valve 36 and to brake cylinder 38.

When there is a low brake setting, the control valve 52 will be in position to block the conduit 35 and thus only the friction brake can be operated.

The control system as disclosed above may be modified by employing switching device 37 to disconnect the hydrodynamic braking unit and connect the friction brake when the speed of the vehicle decreases below a certain value. The control system above employed control valve 52 to carry out this function when the speed of the vehicle decreased. In the modification, however, as soon as a hydrodynamic braking unit becomes inactive because of a low speed of the vehicle the pressure in control line 44 will drop and switching device 37 will be actuated to connect brake cylinder 38 to the conduit 35. This action will render the friction braking system effective.

The anti-skid device of the present invention is effective both with a friction brake and with the hydrodynamic braking unit of a railroad vehicle.

As may be seen in FIG. 2 there is illustrated a flanged railway vehicle wheel 1 mounted upon an axle 2 of a wheel and axle assembly generally indicated at 3 as commonly used on railway vehicles. The wheel and axle assembly 3 is journalled at 4 in an external axle bearing assembly indicated generally at 7 and comprising an antifriction bearing 5 and a housing 6. On the outward side of the axle bearing housing 6, or the side away from the wheel 1, the housing is connected by means of an intermediate supporting member 8, to a housing 9 of a hydrodynamic braking unit indicated generally at 10.

The hydrodynamic braking unit 10 comprises a rotor 12 which is supported within the housing 9 by means of a shaft 11. On one end of the shaft 11 there is mounted a gear 13 of a small diameter which meshes with a larger diameter gear 14 fixed upon an extension of journal 4 extending into the intermediate supporting member 8. Thus, when the vehicle is moving, the rotor 12 of the hydrodynamic braking unit 10 is driven by the journal 4 and gears 14 and 13 at a relatively high rotary speed with respect to the wheel and axle assembly 3. When a hydraulic fluid is introduced into the hydrodynamic braking unit, the fluid acting upon the revolving rotor will exert a high braking effect upon the wheel and axle assembly 3 through the gear drive 13, 14.

It will be understood that the present invention is susceptible to modification in order to adapt to different usages and conditions.

What is claimed is:

1. In a non-driving railroad vehicle, the combination of wheel and axle means supporting a railroad vehicle having air operated friction braking means, a structurally independent hydrodynamic braking unit drivingly connected to the wheel and axle means, control means operable by compressed air for selectively switching said braking unit and said friction braking means between braking and non-braking operation, and means including an anti-skid valve in the air line leading to said friction breaking means responsive to the skidding of the wheels upon a surface for releasing both the friction braking means and hydrodynamic braking unit upon being subjected to the action of compressed air when skidding occurs, said control means includes an operating valve in the air line in front of the hydrodynamic braking unit, and means including a control valve in the air line in front of said operating valve responsive to either the vehicle speed decreasing below a predetermined value or the friction braking means being lightly engaged for closing the air line to disconnect the hydrodynamic braking unit whereby said braking unit is inoperative.

* * * * *